(12) United States Patent
Guo et al.

(10) Patent No.: US 7,288,019 B2
(45) Date of Patent: Oct. 30, 2007

(54) METHOD OF CHANGING THE SURFACE WETTABILITY OF POLYMER MATERIALS

(75) Inventors: Chaowei Guo, Beijing (CN); Lin Feng, Beijing (CN); Lei Jiang, Beijing (CN)

(73) Assignee: Institute of Chemistry, Chinese Academy of Science, Beijing (CN)

( * ) Notice: Subject to any disclaimer, the term of this patent is extended or adjusted under 35 U.S.C. 154(b) by 0 days.

(21) Appl. No.: 10/590,395

(22) PCT Filed: Nov. 30, 2004

(86) PCT No.: PCT/CN2004/001384

§ 371 (c)(1),
(2), (4) Date: Aug. 21, 2006

(87) PCT Pub. No.: WO2005/080476

PCT Pub. Date: Sep. 1, 2005

(65) Prior Publication Data

US 2007/0173179 A1    Jul. 26, 2007

(30) Foreign Application Priority Data

Feb. 24, 2004    (CN) ................. 2004 1 0004721

(51) Int. Cl.
*B24B 1/00*        (2006.01)

(52) U.S. Cl. ............ 451/28; 451/36; 451/59

(58) Field of Classification Search ............ 451/28, 451/36, 55, 59, 60
See application file for complete search history.

(56) References Cited

U.S. PATENT DOCUMENTS

| | | | | |
|---|---|---|---|---|
| 5,922,161 A * | 7/1999 | Wu et al. | ................ | 156/272.6 |
| 5,955,562 A * | 9/1999 | Ash et al. | ................ | 528/220 |
| 5,998,023 A * | 12/1999 | Turkevich et al. | .......... | 428/361 |
| 6,242,041 B1 * | 6/2001 | Katoot et al. | ............ | 427/2.24 |
| 6,555,175 B2 * | 4/2003 | Johnson | ................ | 427/399 |
| 7,026,014 B2 * | 4/2006 | Luzinov et al. | ............ | 427/402 |

* cited by examiner

*Primary Examiner*—Dung Van Nguyen
(74) *Attorney, Agent, or Firm*—Blakely, Sokoloff, Taylor & Zafman; Stephen M. De Klerk

(57) ABSTRACT

The present invention belongs to the field of surface modification of solid materials, specifically relates to a method of changing the surface wettability of polymer materials. The method of the present invention comprises of rubbing the surface of the polymer materials various times by using sand paper of different grades (GB/T 15305) with a determined pressure at the ambient temperature, so as to change the contact angle of said surface of polymer material with water thereby changing the surface wettability of the polymer materials to different degrees. The method of the present invention has advantages of using devices that are simple, low cost, and the surface characteristics of the polymer materials could be changed from hydrophilicity to hydrophobicity, from hydrophobicity to super hydrophobicity, or from hydrophilicity to super hydrophilicity, at ambient temperature without any special requirement to the polymer materials or the preparation process thereof.

7 Claims, 1 Drawing Sheet

METHOD OF CHANGING THE SURFACE WETTABILITY OF POLYMER MATERIALS

CROSS-REFERENCE TO OTHER APPLICATIONS

This is a National Phase of International Application No. PCT/CN2004/001384, filed on Nov. 30, 2004, which claims priority from Chinese Patent Application No. 200410004721.6 filed on Feb. 24, 2004.

FIELD OF THE INVENTION

The present invention belongs to the field of surface modification of solid materials, specifically pertains to a method of changing the surface wettability of polymer materials.

BACKGROUND OF THE INVENTION

Solid surface modification, a well-studied area in surface chemistry and interface engineering, is showing promise in being applied broadly in industry and daily life. The surface property of a solid can be changed after modification of the surface and a series of properties such as absorption, wettability, dispersion, etc. Among the above surface properties of a solid, wettability is of great importance. Wettability is mainly determined by two indispensable factors: the chemical property and the geometrical morphology. The wettability of the solid surface can be changed by changing its roughness.

Currently in this art, there are a variety of methods for modifying the surface of the polymer materials, which may be generally classified as chemical and physical modification methods.

(1) Dipping Modification

In this method, the surface property of the polymer materials is improved by dipping the polymer materials into a treatment solution for oxidization. The disadvantages of using particular treatment solutions include the short life span of such solutions and sometimes repeated dipping.

(2) Photochemical Modification

In this method, the wettability and stickiness of the surface of the polymer materials can be improved through a chemical change induced by the exposure to ultraviolet irradiation.

(3) Surface Graft Modification In this method, plasma, an ultraviolet or chemical agent is used to generate grafting sites on the surface of the polymer materials; then the polymer materials are placed into monomers for grafting.

(4) Radiation Modification

In this method, the polymer materials are subjected to ionization, excitation and the generation of free radicals caused by the radiation in order to break bonds and make cross-links, or the generated free radicals polymerize with other monomers to achieve a surface modification.

(5) Coating Method

In this method, the surface property of the polymer materials is improved by coating some inorganic oxides thereon at a low temperature through a vacuum deposition process.

(6) Plasma Surface Modification

In this method, a large amount of active particles contained in the plasma such as electron, ions, and atoms and molecules in the excited state act on the surface of the polymer materials to induce complex physical and chemical changes causing etching, cracking and polymerizing, and generating a large quantity of free radicals or some polar groups; thus improving the surface property of the polymer materials. The plasma surface modification is advantageous in that only the superficial surface layer of the materials is modified without changing the main body and various surfaces can be modified by using suitable kinds of plasma gases. However, it is disadvantageous in that the degrading effectiveness of plasma exists.

The above methods have main drawbacks as follows during changing of surface wettability of polymer materials:

(1) Wastes are produced, which will pollute the environment, during the chemical modification process;

(2) Radioactive pollutions exist during the radiation modification process;

(3) The vacuum evaporation and plasma surface modification need expensive devices and have a complex operation process.

SUMMARY OF THE INVENTION

The objective of the present invention is to provide a method of changing the surface wettability of polymer materials with a process that is simple, highly effective, low cost, easy to operate, and friendly to the environment.

The method of the present invention comprise of rubbing the surface of the polymer materials in various using sand paper of different grades (GB/T 15305) with a given pressure at the ambient temperature, so as to change the contact angle of said surface of polymer material with water to change the surface wettability of the polymer materials to different degrees.

When the grade of the sand paper is #80, the pressure is 4000 to 7000 Pa and the rubbing times are 5 to 10;

When the grade of the sand paper is #100, the pressure is 4000 to 7000 Pa and the rubbing times are 5 to 10;

When the grade of the sand paper is #120, the pressure is 4000 to 7000 Pa and the rubbing times are 5 to 10;

When the grade of the sand paper is #180, the pressure is 4000 to 7000 Pa and the rubbing times are 5 to 10;

When the grade of the sand paper is #240, the pressure is 4000 to 7000 Pa and the rubbing times are 5 to 10;

When the grade of the sand paper is #300, the pressure is 4000 to 7000 Pa and the rubbing times are 5 to 10;

When the grade of the sand paper is #360, the pressure is 4000 to 7000 Pa and the rubbing times are 5 to 10;

When the grade of the sand paper is #500, the pressure is 7000 to 8000 Pa and the rubbing times are 5 to 10;

When the grade of the sand paper is #600, the pressure is 7000 to 8000 Pa and the rubbing times are 5 to 10;

When the grade of the sand paper is #1200, the pressure is 8000 to 9000 Pa and the rubbing times are 5 to 20;

When the grade of the sand paper is #1500, the pressure is 8000 to 9000 Pa and the rubbing times are 5 to 2°.

According to the present invention, the change of the contact angle of the polymer materials surface with water is 10° to 50° by changing the grade of the sand paper, the pressure, and the rubbing times.

The polymer substrate is selected from polycarbonate substrate, polymethyl methacrylate substrate, polystyrene substrate, polytetrafluoroethylene substrate, polyvinyl alcohol substrate and the like.

The method of the present invention has advantages that the devices required by the method are simple, the cost is low, the process is easy to operate and the surface characteristics of the polymer materials can be changed from hydrophilicity to hydrophobicity, from hydrophobicity to super hydrophobicity, or from hydrophilicity to super hydrophilicity, even at ambient temperature without any special requirement to the polymer materials or the preparation process thereof. For example, the surface characteristics of polycarbonate substrate, polymethyl methacrylate substrate and polystyrene substrate can be changed from hydrophilicity to hydrophobicity by rubbing, and the surface characteristic of polytetrafluoroethylene substrate can be changed from hydrophilicity to super hydrophilicity by rubbing.

DETAILED DESCRIPTION OF THE PREFERRED EMBODIMENTS

Figure 1A:
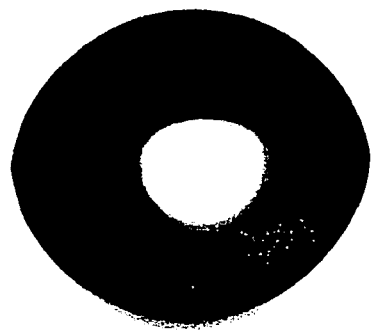
FIG. 1A is an image showing the contact angle of the polymer surface with water before rubbing according to Example 50 of the present invention.

Hereinafter, the present invention will be described in detail with reference to the following examples.

EXAMPLE 1

The surface of polycarbonate substrate was rubbed back and forth 10 times by using a #80 sand paper with a pressure of 4000 Pa at the ambient temperature, so as to change the surface contact angle from 86° to 116°.

EXAMPLE 2

The surface of polycarbonate substrate was rubbed back and forth 8 times by using a #80 sand paper with a pressure of 5700 Pa at the ambient temperature, so as to change the surface contact angle from 86° to 122°.

EXAMPLE 3

The surface of polycarbonate substrate was rubbed back and forth 5 times by using a #80 sand paper with a pressure of 7000 Pa at the ambient temperature, so as to change the surface contact angle from 86° to 120°.

EXAMPLE 4

The surface of polymethyl methacrylate substrate was rubbed back and forth 10 times by using a #80 sand paper with a pressure of 4000 Pa at the ambient temperature, so as to change the surface contact angle from 75° to 103°.

EXAMPLE 5

The surface of polymethyl methacrylate substrate was rubbed back and forth 8 times by using a #80 sand paper with a pressure of 5700 Pa at the ambient temperature, so as to change the surface contact angle from 75° to 109°.

EXAMPLE 6

The surface of polymethyl methacrylate substrate was rubbed back and forth 5 times by using a #80 sand paper with a pressure of 7000 Pa at the ambient temperature, so as to change the surface contact angle from 75° to 105°.

EXAMPLE 7

The surface of polystyrene substrate was rubbed back and forth 10 times by using a #80 sand paper with a pressure of 4000 Pa at the ambient temperature, so as to change the surface contact angle from 78° to 107°.

EXAMPLE 8

The surface of polystyrene substrate was rubbed back and forth 8 times by using a #80 sand paper with a pressure of 5700 Pa at the ambient temperature, so as to change the surface contact angle from 78° to 113°.

EXAMPLE 9

The surface of polystyrene substrate was rubbed back and forth 5 times by using a #80 sand paper with a pressure of 7000 Pa at the ambient temperature, so as to change the surface contact angle from 78° to 110°.

EXAMPLE 10

The surface of polytetrafluoroethylene substrate was rubbed back and forth 10 times by using a #80 sand paper with a pressure of 4000 Pa at the ambient temperature, so as to change the surface contact angle from 108° to 112°.

EXAMPLE 11

The surface of polytetrafluoroethylene substrate was rubbed back and forth 8 times by using a #80 sand paper with a pressure of 5700 Pa at the ambient temperature, so as to change the surface contact angle from 108° to 114.5°.

EXAMPLE 12

The surface of polytetrafluoroethylene substrate was rubbed back and forth 5 times by using a #80 sand paper with a pressure of 7000 Pa at the ambient temperature, so as to change the surface contact angle from 108° to 119°.

EXAMPLE 13

The surface of polyvinyl alcohol substrate was rubbed back and forth 10 times by using a #80 sand paper with a pressure of 4000 Pa at the ambient temperature, so as to change the surface contact angle from 45° to 40°.

EXAMPLE 14

The surface of polyvinyl alcohol substrate was rubbed back and forth 10 times by using a #80 sand paper with a pressure of 5700 Pa at the ambient temperature, so as to change the surface contact angle from 45° to 33°.

EXAMPLE 15

The surface of polyvinyl alcohol substrate was rubbed back and forth 5 times by using a #80 sand paper with a pressure of 7000 Pa at the ambient temperature, so as to change the surface contact angle from 45° to 37°.

EXAMPLE 16

The surface of polycarbonate substrate was rubbed back and forth 10 times by using a #100 sand paper with a pressure of 4000 Pa at the ambient temperature, so as to change the surface contact angle from 86° to 123°.

EXAMPLE 17

The surface of polycarbonate substrate was rubbed back and forth 10 times by using a #100 sand paper with a pressure of 5700 Pa at the ambient temperature, so as to change the surface contact angle from 86° to 129°.

EXAMPLE 18

The surface of polycarbonate substrate was rubbed back and forth 5 times by using a #100 sand paper with a pressure of 7000 Pa at the ambient temperature, so as to change the surface contact angle from 86° to 125°.

EXAMPLE 19

The surface of polymethyl methacrylate substrate was rubbed back and forth 10 times by using a #100 sand paper with a pressure of 4000 Pa at the ambient temperature, so as to change the surface contact angle from 75° to 117°.

EXAMPLE 20

The surface of polymethyl methacrylate substrate was rubbed back and forth 5 times by using a #100 sand paper with a pressure of 7000 Pa at the ambient temperature, so as to change the surface contact angle from 75° to 113°.

EXAMPLE 21

The surface of polystyrene substrate was rubbed back and forth 10 times by using a #100 sand paper with a pressure of 4000 Pa at the ambient temperature, so as to change the surface contact angle from 78° to 120°.

EXAMPLE 22

The surface of polystyrene substrate was rubbed back and forth 5 times by using a #100 sand paper with a pressure of 7000 Pa at the ambient temperature, so as to change the surface contact angle from 78° to 123°.

EXAMPLE 23

The surface of polytetrafluoroethylene substrate was rubbed back and forth 10 times by using a #100 sand paper with a pressure of 4000 Pa at the ambient temperature, so as to change the surface contact angle from 108° to 131.2°.

EXAMPLE 24

The surface of polytetrafluoroethylene substrate was rubbed back and forth 8 times by using a #100 sand paper with a pressure of 5700 Pa at the ambient temperature, so as to change the surface contact angle from 108° to 135.1°.

EXAMPLE 25

The surface of polytetrafluoroethylene substrate was rubbed back and forth 5 times by using a #100 sand paper with a pressure of 7000 Pa at the ambient temperature, so as to change the surface contact angle from 108° to 128.5°.

EXAMPLE 26

The surface of polyvinyl alcohol substrate was rubbed back and forth 10 times by using a #100 sand paper with a pressure of 4000 Pa at the ambient temperature, so as to change the surface contact angle from 45° to 26°.

EXAMPLE 27

The surface of polyvinyl alcohol substrate was rubbed back and forth 5 times by using a #100 sand paper with a pressure of 7000 Pa at the ambient temperature, so as to change the surface contact angle from 45° to 34°.

EXAMPLE 28

The surface of polycarbonate substrate was rubbed back and forth 10 times by using a #120 sand paper with a pressure of 4000 Pa at the ambient temperature, so as to change the surface contact angle from 86° to 124°.

EXAMPLE 29

The surface of polycarbonate substrate was rubbed back and forth 5 times by using a #120 sand paper with a pressure of 7000 Pa at the ambient temperature, so as to change the surface contact angle from 86° to 130°.

EXAMPLE 30

The surface of polymethyl methacrylate substrate was rubbed back and forth 10 times by using a #120 sand paper with a pressure of 4000 Pa at the ambient temperature, so as to change the surface contact angle from 75° to 121°.

EXAMPLE 31

The surface of polymethyl methacrylate substrate was rubbed back and forth 5 times by using a #120 sand paper with a pressure of 7000 Pa at the ambient temperature, so as to change the surface contact angle from 75° to 127°.

EXAMPLE 32

The surface of polystyrene substrate was rubbed back and forth 10 times by using a #120 sand paper with a pressure of 4000 Pa at the ambient temperature, so as to change the surface contact angle from 78° to 135°.

EXAMPLE 33

The surface of polystyrene substrate was rubbed back and forth 5 times by using a #120 sand paper with a pressure of 7000 Pa at the ambient temperature, so as to change the surface contact angle from 78° to 130°.

EXAMPLE 34

The surface of polytetrafluoroethylene substrate was rubbed back and forth 10 times by using a #120 sand paper with a pressure of 4000 Pa at the ambient temperature, so as to change the surface contact angle from 108° to 133°.

EXAMPLE 35

The surface of polytetrafluoroethylene substrate was rubbed back and forth 8 times by using a #120 sand paper with a pressure of 5700 Pa at the ambient temperature, so as to change the surface contact angle from 108° to 137°.

EXAMPLE 36

The surface of polytetrafluoroethylene substrate was rubbed back and forth 5 times by using a #120 sand paper with a pressure of 7000 Pa at the ambient temperature, so as to change the surface contact angle from 108° to 131°.

EXAMPLE 37

The surface of polyvinyl alcohol substrate was rubbed back and forth 10 times by using a #120 sand paper with a pressure of 4000 Pa at the ambient temperature, so as to change the surface contact angle from 45° to 33°.

EXAMPLE 38

The surface of polyvinyl alcohol substrate was rubbed back and forth 5 times by using a #120 sand paper with a pressure of 7000 Pa at the ambient temperature, so as to change the surface contact angle from 45° to 23°.

EXAMPLE 39

The surface of polycarbonate substrate was rubbed back and forth 10 times by using a #180 sand paper with a pressure of 4000 Pa at the ambient temperature, so as to change the surface contact angle from 86° to 124°.

EXAMPLE 40

The surface of polycarbonate substrate was rubbed back and forth 5 times by using a #180 sand paper with a pressure of 7000 Pa at the ambient temperature, so as to change the surface contact angle from 86° to 120°.

EXAMPLE 41

The surface of polymethyl methacrylate substrate was rubbed back and forth 10 times by using a #180 sand paper with a pressure of 4000 Pa at the ambient temperature, so as to change the surface contact angle from 75° to 115°.

EXAMPLE 42

The surface of polymethyl methacrylate substrate was rubbed back and forth 5 times by using a #180 sand paper with a pressure of 7000 Pa at the ambient temperature, so as to change the surface contact angle from 75° to 110°.

EXAMPLE 43

The surface of polystyrene substrate was rubbed back and forth 10 times by using a #180 sand paper with a pressure of 4000 Pa at the ambient temperature, so as to change the surface contact angle from 78° to 137°.

EXAMPLE 44

The surface of polystyrene substrate was rubbed back and forth 5 times by using a #180 sand paper with a pressure of 7000 Pa at the ambient temperature, so as to change the surface contact angle from 78° to 132°.

EXAMPLE 45

The surface of polytetrafluoroethylene substrate was rubbed back and forth 10 times by using a #180 sand paper with a pressure of 4000 Pa at the ambient temperature, so as to change the surface contact angle from 108° to 139°.

EXAMPLE 46

The surface of polytetrafluoroethylene substrate was rubbed back and forth 8 times by using a #180 sand paper with a pressure of 5700 Pa at the ambient temperature, so as to change the surface contact angle from 108° to 143°.

EXAMPLE 47

The surface of polytetrafluoroethylene substrate was rubbed back and forth 5 times by using a #180 sand paper with a pressure of 7000 Pa at the ambient temperature, so as to change the surface contact angle from 108° to 140°.

EXAMPLE 48

The surface of polyvinyl alcohol substrate was rubbed back and forth 10 times by using a #180 sand paper with a pressure of 4000 Pa at the ambient temperature, so as to change the surface contact angle from 45° to 24°.

EXAMPLE 49

The surface of polyvinyl alcohol substrate was rubbed back and forth 5 times by using a #180 sand paper with a pressure of 7000 Pa at the ambient temperature, so as to change the surface contact angle from 45° to 14°.

EXAMPLE 50

Figure 1B:
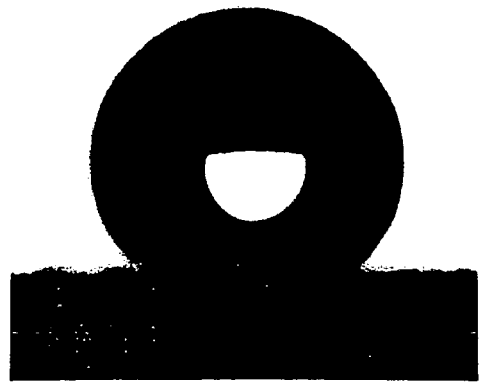
FIG. 1B is an image showing the contact angle of the polymer surface with water after rubbing according to Example 50 of the present invention.

The surface of polycarbonate substrate was rubbed back and forth 10 times by using a #240 sand paper with a pressure of 4000 Pa at the ambient temperature, so as to change the surface contact angle from 86° to 136° as shown in FIGS. 1A and 1B.

EXAMPLE 51

The surface of polycarbonate substrate was rubbed back and forth 5 times by using a #240 sand paper with a pressure of 7000 Pa at the ambient temperature, so as to change the surface contact angle from 86° to 130°.

EXAMPLE 52

The surface of polymethyl methacrylate substrate was rubbed back and forth 10 times by using a #240 sand paper with a pressure of 4000 Pa at the ambient temperature, so as to change the surface contact angle from 75° to 131°.

EXAMPLE 53

The surface of polymethyl methacrylate substrate was rubbed back and forth 5 times by using a #240 sand paper with a pressure of 7000 Pa at the ambient temperature, so as to change the surface contact angle from 75° to 135°.

EXAMPLE 54

The surface of polystyrene substrate was rubbed back and forth 10 times by using a #240 sand paper with a pressure of 4000 Pa at the ambient temperature, so as to change the surface contact angle from 78° to 140°.

EXAMPLE 55

The surface of polystyrene substrate was rubbed back and forth 5 times by using a #240 sand paper with a pressure of 7000 Pa at the ambient temperature, so as to change the surface contact angle from 78° to 134°.

EXAMPLE 56

The surface of polytetrafluoroethylene substrate was rubbed back and forth 10 times by using a #240 sand paper with a pressure of 4000 Pa at the ambient temperature, so as to change the surface contact angle from 108° to 150°.

EXAMPLE 57

Figure 2A:
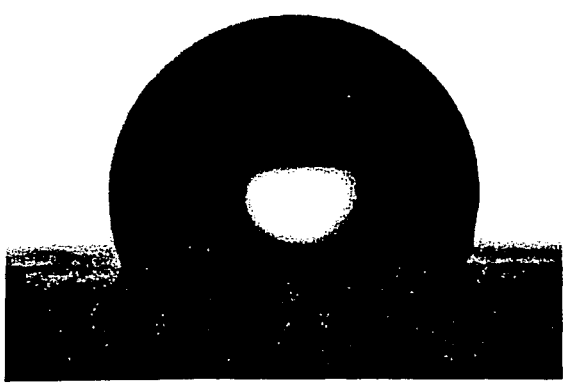
FIG. 2A is an image showing the contact angle of the polymer surface with water before rubbing according to Example 57 of the present invention.
Figure 2B:
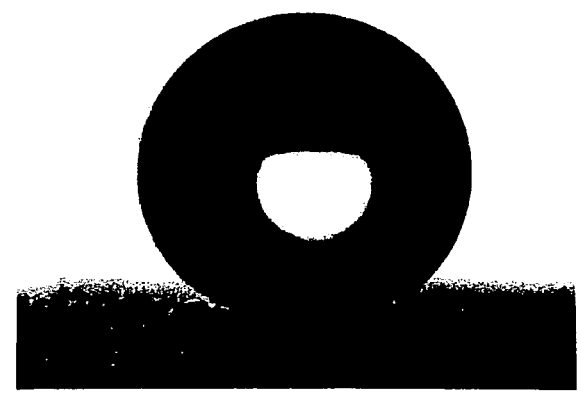
FIG. 2B is an image showing the contact angle of the polymer surface with water after rubbing according to Example 57 of the present invention.

The surface of polytetrafluoroethylene substrate was rubbed back and forth 8 times by using a #240 sand paper with a pressure of 5700 Pa at the ambient temperature, so as to change the surface contact angle from 108° to 160° as shown in FIGS. 2A and 2B.

EXAMPLE 58

The surface of polytetrafluoroethylene substrate was rubbed back and forth 5 times by using a #240 sand paper with a pressure of 7000 Pa at the ambient temperature, so as to change the surface contact angle from 108° to 156°.

EXAMPLE 59

The surface of polyvinyl alcohol substrate was rubbed back and forth 10 times by using a #240 sand paper with a pressure of 4000 Pa at the ambient temperature, so as to change the surface contact angle from 45° to 15°.

EXAMPLE 60

Figure 3A:
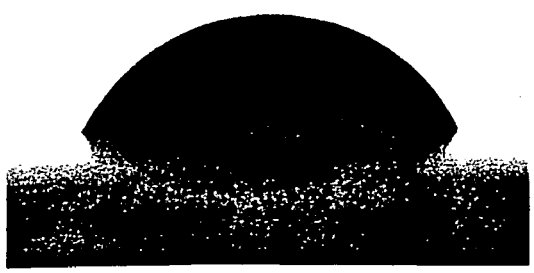
FIG. 3A is an image showing the contact angle of the polymer surface with water before rubbing according to Example 60 of the present invention.
Figure 3B:
FIG. 3B is an image showing the contact angle of the polymer surface with water after rubbing according to Example 60 of the present invention.

The surface of polyvinyl alcohol substrate was rubbed back and forth 5 times by using a #240 sand paper with a pressure of 5700 Pa at the ambient temperature, so as to change the surface contact angle from 45° to 5° as shown in FIGS. 3A and 3B.

EXAMPLE 61

The surface of polycarbonate substrate was rubbed back and forth 10 times by using a #300 sand paper with a pressure of 4000 Pa at the ambient temperature, so as to change the surface contact angle from 86° to 134°.

EXAMPLE 62

The surface of polycarbonate substrate was rubbed back and forth 5 times by using a #300 sand paper with a pressure of 7000 Pa at the ambient temperature, so as to change the surface contact angle from 86° to 130°.

EXAMPLE 63

The surface of polymethyl methacrylate substrate was rubbed back and forth 10 times by using a #300 sand paper with a pressure of 4000 Pa at the ambient temperature, so as to change the surface contact angle from 75° to 137°.

EXAMPLE 64

The surface of polymethyl methacrylate substrate was rubbed back and forth 5 times by using a #300 sand paper with a pressure of 7000 Pa at the ambient temperature, so as to change the surface contact angle from 75° to 132°.

EXAMPLE 65

The surface of polystyrene substrate was rubbed back and forth 10 times by using a #300 sand paper with a pressure of 4000 Pa at the ambient temperature, so as to change the surface contact angle from 78° to 134°.

EXAMPLE 66

The surface of polystyrene substrate was rubbed back and forth 5 times by using a #300 sand paper with a pressure of 7000 Pa at the ambient temperature, so as to change the surface contact angle from 78° to 137°.

EXAMPLE 67

The surface of polytetrafluoroethylene substrate was rubbed back and forth 10 times by using a #300 sand paper with a pressure of 4000 Pa at the ambient temperature, so as to change the surface contact angle from 108° to 140°.

EXAMPLE 68

The surface of polytetrafluoroethylene substrate was rubbed back and forth 8 times by using a #300 sand paper with a pressure of 5700 Pa at the ambient temperature, so as to change the surface contact angle from 108° to 144°.

EXAMPLE 69

The surface of polytetrafluoroethylene substrate was rubbed back and forth 5 times by using a #300 sand paper with a pressure of 7000 Pa at the ambient temperature, so as to change the surface contact angle from 108° to 149°.

EXAMPLE 70

The surface of polyvinyl alcohol substrate was rubbed back and forth 10 times by using a #300 sand paper with a pressure of 4000 Pa at the ambient temperature, so as to change the surface contact angle from 45° to 29°.

EXAMPLE 71

The surface of polyvinyl alcohol substrate was rubbed back and forth 5 times by using a #300 sand paper with a pressure of 7000 Pa at the ambient temperature, so as to change the surface contact angle from 45° to 11°.

EXAMPLE 72

The surface of polycarbonate substrate was rubbed back and forth 10 times by using a #360 sand paper with a pressure of 4000 Pa at the ambient temperature, so as to change the surface contact angle from 86° to 131°.

EXAMPLE 73

The surface of polycarbonate substrate was rubbed back and forth 5 times by using a #360 sand paper with a pressure of 7000 Pa at the ambient temperature, so as to change the surface contact angle from 86° to 125°.

EXAMPLE 74

The surface of polymethyl methacrylate substrate was rubbed back and forth 10 times by using a #360 sand paper with a pressure of 4000 Pa at the ambient temperature, so as to change the surface contact angle from 75° to 127°.

EXAMPLE 75

The surface of polymethyl methacrylate substrate was rubbed back and forth 5 times by using a #360 sand paper with a pressure of 7000 Pa at the ambient temperature, so as to change the surface contact angle from 75° to 121°.

EXAMPLE 76

The surface of polystyrene substrate was rubbed back and forth 10 times by using a #360 sand paper with a pressure of 4000 Pa at the ambient temperature, so as to change the surface contact angle from 78° to 131°.

EXAMPLE 77

The surface of polystyrene substrate was rubbed back and forth 5 times by using a #360 sand paper with a pressure of 7000 Pa at the ambient temperature, so as to change the surface contact angle from 78° to 121°.

EXAMPLE 78

The surface of polytetrafluoroethylene substrate was rubbed back and forth 10 times by using a #360 sand paper with a pressure of 4000 Pa at the ambient temperature, so as to change the surface contact angle from 108° to 140°.

EXAMPLE 79

The surface of polytetrafluoroethylene substrate was rubbed back and forth 8 times by using a #360 sand paper with a pressure of 5700 Pa at the ambient temperature, so as to change the surface contact angle from 108° to 142°.

EXAMPLE 81

The surface of polytetrafluoroethylene substrate was rubbed back and forth 5 times by using a #360 sand paper with a pressure of 7000 Pa at the ambient temperature, so as to change the surface contact angle from 108° to 134°.

EXAMPLE 82

The surface of polyvinyl alcohol substrate was rubbed back and forth 10 times by using a #360 sand paper with a pressure of 4000 Pa at the ambient temperature, so as to change the surface contact angle from 45° to 34°.

EXAMPLE 83

The surface of polyvinyl alcohol substrate was rubbed back and forth 5 times by using a #360 sand paper with a pressure of 7000 Pa at the ambient temperature, so as to change the surface contact angle from 45° to 17°.

EXAMPLE 84

The surface of polycarbonate substrate was rubbed back and forth 10 times by using a #500 sand paper with a pressure of 7000 Pa at the ambient temperature, so as to change the surface contact angle from 86° to 118°.

EXAMPLE 85

The surface of polycarbonate substrate was rubbed back and forth 5 times by using a #500 sand paper with a pressure of 8000 Pa at the ambient temperature, so as to change the surface contact angle from 86° to 115°.

EXAMPLE 86

The surface of polymethyl methacrylate substrate was rubbed back and forth 10 times by using a #500 sand paper with a pressure of 7000 Pa at the ambient temperature, so as to change the surface contact angle from 75° to 109°.

EXAMPLE 87

The surface of polymethyl methacrylate substrate was rubbed back and forth 5 times by using a #500 sand paper with a pressure of 8000 Pa at the ambient temperature, so as to change the surface contact angle from 75° to 114°.

EXAMPLE 88

The surface of polystyrene substrate was rubbed back and forth 10 times by using a #500 sand paper with a pressure of 7000 Pa at the ambient temperature, so as to change the surface contact angle from 78° to 107°.

EXAMPLE 89

The surface of polystyrene substrate was rubbed back and forth 5 times by using a #500 sand paper with a pressure of 8000 Pa at the ambient temperature, so as to change the surface contact angle from 78° to 113°.

EXAMPLE 90

The surface of polytetrafluoroethylene substrate was rubbed back and forth 10 times by using a #500 sand paper with a pressure of 7000 Pa at the ambient temperature, so as to change the surface contact angle from 108° to 131°.

EXAMPLE 91

The surface of polytetrafluoroethylene substrate was rubbed back and forth 5-times by using a #500 sand paper with a pressure of 8000 Pa at the ambient temperature, so as to change the surface contact angle from 108° to 126°.

EXAMPLE 92

The surface of polyvinyl alcohol substrate was rubbed back and forth 10 times by using a #500 sand paper with a pressure of 7000 Pa at the ambient temperature, so as to change the surface contact angle from 45° to 21°.

EXAMPLE 93

The surface of polyvinyl alcohol substrate was rubbed back and forth 5 times by using a #500 sand paper with a pressure of 8000 Pa at the ambient temperature, so as to change the surface contact angle from 45° to 31°.

EXAMPLE 94

The surface of polycarbonate substrate was rubbed back and forth 10 times by using a #600 sand paper with a pressure of 7000 Pa at the ambient temperature, so as to change the surface contact angle from 86° to 119°.

EXAMPLE 95

The surface of polycarbonate substrate was rubbed back and forth 5 times by using a #600 sand paper with a pressure of 8000 Pa at the ambient temperature, so as to change the surface contact angle from 86° to 115°.

EXAMPLE 96

The surface of polymethyl methacrylate substrate was rubbed back and forth 10 times by using a #600 sand paper with a pressure of 7000 Pa at the ambient temperature, so as to change the surface contact angle from 75° to 110°.

EXAMPLE 97

The surface of polymethyl methacrylate substrate was rubbed back and forth 5 times by using a #600 sand paper with a pressure of 8000 Pa at the ambient temperature, so as to change the surface contact angle from 75° to 104°.

EXAMPLE 98

The surface of polystyrene substrate was rubbed back and forth 10 times by using a #600 sand paper with a pressure of 7000 Pa at the ambient temperature, so as to change the surface contact angle from 78° to 114°.

EXAMPLE 99

The surface of polystyrene substrate was rubbed back and forth 5 times by using a #600 sand paper with a pressure of 8000 Pa at the ambient temperature, so as to change the surface contact angle from 78° to 107°.

EXAMPLE 100

The surface of polytetrafluoroethylene substrate was rubbed back and forth 10 times by using a #600 sand paper with a pressure of 7000 Pa at the ambient temperature, so as to change the surface contact angle from 108° to 133°.

EXAMPLE 101

The surface of polytetrafluoroethylene substrate was rubbed back and forth 5 times by using a #600 sand paper with a pressure of 8000 Pa at the ambient temperature, so as to change the surface contact angle from 108° to 126°.

EXAMPLE 102

The surface of polyvinyl alcohol substrate was rubbed back and forth 10 times by using a #600 sand paper with a pressure of 7000 Pa at the ambient temperature, so as to change the surface contact angle from 45° to 34°.

EXAMPLE 103

The surface of polyvinyl alcohol substrate was rubbed back and forth 5 times by using a #600 sand paper with a pressure of 8000 Pa at the ambient temperature, so as to change the surface contact angle from 45° to 24°.

EXAMPLE 104

The surface of polycarbonate substrate was rubbed back and forth 20 times by using a #1200 sand paper with a pressure of 8000 Pa at the ambient temperature, so as to change the surface contact angle from 86° to 108°.

EXAMPLE 105

The surface of polycarbonate substrate was rubbed back and forth 5 times by using a #1200 sand paper with a pressure of 9000 Pa at the ambient temperature, so as to change the surface contact angle from 86° to 102°.

EXAMPLE 106

The surface of polymethyl methacrylate substrate was rubbed back and forth 20 times by using a #1200 sand paper with a pressure of 8000 Pa at the ambient temperature, so as to change the surface contact angle from 75° to 97°.

EXAMPLE 107

The surface of polymethyl methacrylatesubstrate was rubbed back and forth 5 times by using a #1200 sand paper with a pressure of 9000 Pa at the ambient temperature, so as to change the surface contact angle from 75° to 91°.

EXAMPLE 108

The surface of polystyrene substrate was rubbed back and forth 20 times by using a #1200 sand paper with a pressure of 8000 Pa at the ambient temperature, so as to change the surface contact angle from 78° to 101°.

EXAMPLE 109

The surface of polystyrene substrate was rubbed back and forth 5 times by using a #1200 sand paper with a pressure of 9000 Pa at the ambient temperature, so as to change the surface contact angle from 78° to 94°.

EXAMPLE 110

The surface of polytetrafluoroethylene substrate was rubbed back and forth 20 times by using a #1200 sand paper with a pressure of 8000 Pa at the ambient temperature, so as to change the surface contact angle from 108° to 111°.

EXAMPLE 111

The surface of polytetrafluoroethylene substrate was rubbed back and forth 5 times by using a #1200 sand paper with a pressure of 9000 Pa at the ambient temperature, so as to change the surface contact angle from 108° to 109°.

EXAMPLE 112

The surface of polyvinyl alcohol substrate was rubbed back and forth 20 times by using a #1200 sand paper with a pressure of 8000 Pa at the ambient temperature, so as to change the surface contact angle from 45° to 31°.

EXAMPLE 113

The surface of polyvinyl alcohol substrate was rubbed back and forth 5 times by using a #1200 sand paper with a pressure of 9000 Pa at the ambient temperature, so as to change the surface contact angle from 45° to 41°.

EXAMPLE 114

The surface of polycarbonate substrate was rubbed back and forth 20 times by using a #1500 sand paper with a pressure of 8000 Pa at the ambient temperature, so as to change the surface contact angle from 86° to 95°.

EXAMPLE 115

The surface of polycarbonate substrate was rubbed back and forth 5 times by using a #1500 sand paper with a pressure of 9000 Pa at the ambient temperature, so as to change the surface contact angle from 86° to 90°.

EXAMPLE 116

The surface of polymethyl methacrylate substrate was rubbed back and forth 20 times by using a #1500 sand paper with a pressure of 8000 Pa at the ambient temperature, so as to change the surface contact angle from 75° to 92°.

EXAMPLE 117

The surface of polymethyl methacrylate substrate was rubbed back and forth 5 times by using a #1500 sand paper with a pressure of 9000 Pa at the ambient temperature, so as to change the surface contact angle from 75° to 85°.

EXAMPLE 118

The surface of polystyrene substrate was rubbed back and forth 20 times by using a #1500 sand paper with a pressure of 8000 Pa at the ambient temperature, so as to change the surface contact angle from 78° to 93°.

EXAMPLE 119

The surface of polystyrene substrate was rubbed back and forth 5 times by using a #1500 sand paper with a pressure of 9000 Pa at the ambient temperature, so as to change the surface contact angle from 78° to 90°.

EXAMPLE 120

The surface of polytetrafluoroethylene substrate was rubbed back and forth 20 times by using a #1500 sand paper with a pressure of 8000 Pa at the ambient temperature, so as to change the surface contact angle from 108° to 106°.

EXAMPLE 121

The surface of polytetrafluoroethylene substrate was rubbed back and forth 5 times by using a #1500 sand paper with a pressure of 9000 Pa at the ambient temperature, so as to change the surface contact angle from 108° to 101°.

EXAMPLE 122

The surface of polyvinyl alcohol substrate was rubbed back and forth 20 times by using a #1500 sand paper with a pressure of 8000 Pa at the ambient temperature, so as to change the surface contact angle from 45° to 40°.

EXAMPLE 123

The surface of polyvinyl alcohol substrate was rubbed back and forth 5 times by using a #1500 sand paper with a pressure of 9000 Pa at the ambient temperature, so as to change the surface contact angle from 45° to 53°.

What we claim is:

1. A method of changing the surface wettability of polymer materials, characterized in that:
    it comprises of rubbing the surface of the polymer materials by using sand paper with a predetermined pressure at the ambient temperature, so as to change the contact angle of said surface of polymer material with water thereby changing the surface wettability of the polymer materials to different degrees.

2. The method of claim 1, characterized in that: the pressure is 4000 to 7000 Pa, and
    the grade of the sand paper is #80, and the rubbing times are 5-10;
    the grade of the sand paper is #100, and the rubbing times are 5-10;
    the grade of the sand paper is #120, and the rubbing times are 5-10;
    the grade of the sand paper is #180, and the rubbing times are 5-10;
    the grade of the sand paper is #240, and the rubbing times are 5-10;
    the grade of the sand paper is #300, and the rubbing times are 5-10; or
    the grade of the sand paper is #360, and the rubbing times are 5-10.

3. The method of claim 1, characterized in that: the pressure is 7000 to 8000 Pa, and the grade of the sand paper is #500, and the rubbing times are 5-10; or the grade of the sand paper is #600, and the rubbing times are 5-10.

4. The method of claim 1, characterized in that:

the pressure is 8000 to 9000 Pa, the grade of the sand paper is #1200, and the rubbing times are 5-20.

5. The method of claim 1, characterized in that:

the pressure is 8000 to 9000 Pa, the grade of the sand paper is #1500, and the rubbing times are 5-20.

6. The method of claim 1, characterized in that:

the polymer material is selected from polycarbonate substrate, polymethyl methacrylate substrate, polystyrene substrate, polytetrafluoroethylene substrate and polyvinyl alcohol substrate.

7. The method of claim 1, characterized in that:

the change of the contact angle of the polymer materials with water is 10° to 50°.

* * * * *